(12) United States Patent
Sanders et al.

(10) Patent No.: US 7,277,387 B2
(45) Date of Patent: Oct. 2, 2007

(54) PACKAGE MANAGER

(75) Inventors: Michael Sanders, The Sea Ranch, CA (US); Rick Pitz, Penngrove, CA (US)

(73) Assignee: Wind River Systems, Inc., Alameda, CA (US)

( * ) Notice: Subject to any disclaimer, the term of this patent is extended or adjusted under 35 U.S.C. 154(b) by 1031 days.

(21) Appl. No.: 10/355,957

(22) Filed: Jan. 30, 2003

(65) Prior Publication Data

US 2004/0151160 A1    Aug. 5, 2004

(51) Int. Cl.
*H04S 1/16* (2006.01)
(52) U.S. Cl. ...................... 370/230; 370/352
(58) Field of Classification Search ............... 370/230, 370/352, 356, 4.1
See application file for complete search history.

(56) References Cited

U.S. PATENT DOCUMENTS

| | | | |
|---|---|---|---|
| 6,195,692 B1 * | 2/2001 | Hsu | 725/110 |
| 6,369,855 B1 * | 4/2002 | Chauvel et al. | 348/423.1 |
| 6,573,846 B1 * | 6/2003 | Trivedi et al. | 341/67 |
| 2002/0171745 A1 * | 11/2002 | Ehrhart | 348/231.3 |
| 2003/0206519 A1 * | 11/2003 | Sanders et al. | 370/230 |

* cited by examiner

*Primary Examiner*—Creighton Smith
(74) *Attorney, Agent, or Firm*—Fay Kaplun & Marcin, LLP

(57) ABSTRACT

A package manager of a media gateway component is described, which is configured to receive requests to encode or decode a message containing package descriptors. The package manager determines the type of package descriptor, and invokes the appropriate helper function which carries out the encoding or decoding operation. The package manager includes a package resolver portion that interfaces with other elements of the media gateway component, and a package helper portion that stores the helper functions. The package resolver portion includes a package list that describes the correlation between package descriptors and the corresponding helper functions.

28 Claims, 3 Drawing Sheets

Figure 1. Megaco Components

PACKAGE MANAGER

BACKGROUND INFORMATION

Typical telephone networks that are used conventionally to connect residential and business telephone lines form a public switched telephone network ("PSTN") which encompasses most of the world's collection of voice-oriented public telephone networks. The PSTN is an aggregation of circuit switching telephone networks which route phone calls between consumers. Today, the PSTN includes almost entirely digital technology, but some analog remnants remain (e.g., the final link from a central office to the user). The transmission and routing of calls via the PSTN is governed by a set of standards, so that various providers of telephone service may easily route calls between their customers. Thus, a first consumer having telephone service A is able to call a second consumer having telephone service B, and the routing of such a call may go through networks owned by various other telephone services C-E. The result is the appearance of a seamless transmission between the first and second consumer.

As an alternative to using standard telephones on the PSTN, consumers may also use their personal computers ("PCs") to make phone calls to other PC users. The transmission of a call via a PC is generally referred to as Voice over Internet Protocol ("VoIP") technology. VoIP is a set of facilities for managing the delivery of voice information using the Internet Protocol. These PC to PC phone calls are transmitted via the Internet. However, in some instances, a consumer on a standard telephone may desire to call a consumer using a PC phone, or vice versa. Thus, standards have been developed to effectively route these types of phone calls between the PSTN and VoIP networks.

A variety of protocols are used to handle telephone calls made to and from PC's, such as the MEGACO standard by the Internet Engineering Task Force (IETF), the Media Gateway Control Protocol (MGCP) and the Session Initiation Protocol (SIP). These protocols seek to bridge the gap between circuit based public switched networks and Internet Protocol (IP) based networks. Each of the protocols uses different conventions and has different sets of function calls and variables, which generally require an interface tailor made for the specific protocol to communicate with the transport layer. On the other hand, many different protocols also exist at the transport layer level, where the calls are routed to the Internet. The User Datagram Protocol (UDP), Stream Control Transmission Protocol (SCTP) and the Transmission Control Protocol (TCP) are three such protocols. Access to these protocols also requires an interface that is specific to that protocol.

Media Gateway units (MG's) are the elements that physically connect the computer network elements of the telephone system with the conventional telephone network elements (PSTN), to provide the VoIP capability. The primary function of the MG unit is to provide hardware services, and thus typically it may include codecs, compression devices (DSP's), tone generation and detection functions, line terminations such as T1, ISDN, POTS and ATM VC's, etc. The media gateway unit generally includes two principal components. One component is the user's application that is implemented on the MG, and is referred to as the hardware service provider (HSP). Another component is the media gateway software component, which carries out media gateway functions not implemented in the HSP, such as interfacing with the network protocols.

SUMMARY OF THE INVENTION

In one exemplary embodiment, the present invention is a system which includes a package manager configured to receive from an encode/decode library a message to be encoded or decoded, a package resolver element of the package manager configured to provide an interface with the encode/decode library, and a package helper element of the package manager, configured to provide helper functions to the package resolver element, the helper functions performing at least one of encoding operations and decoding operations on the message.

In another exemplary embodiment, the invention is a method for encoding and decoding a package descriptor of a package in a media gateway component. The method includes receiving in a package manager one of an encode and decode function from an encode/decode library, the function having an argument formed at least in part from the package descriptor, obtaining a pointer for an helper function associated with the argument, the helper function being adapted to perform encoding and decoding operations, and invoking the helper function to perform at least one of an encode and a decode operation on the argument.

DETAILED DESCRIPTION

Figure 1:
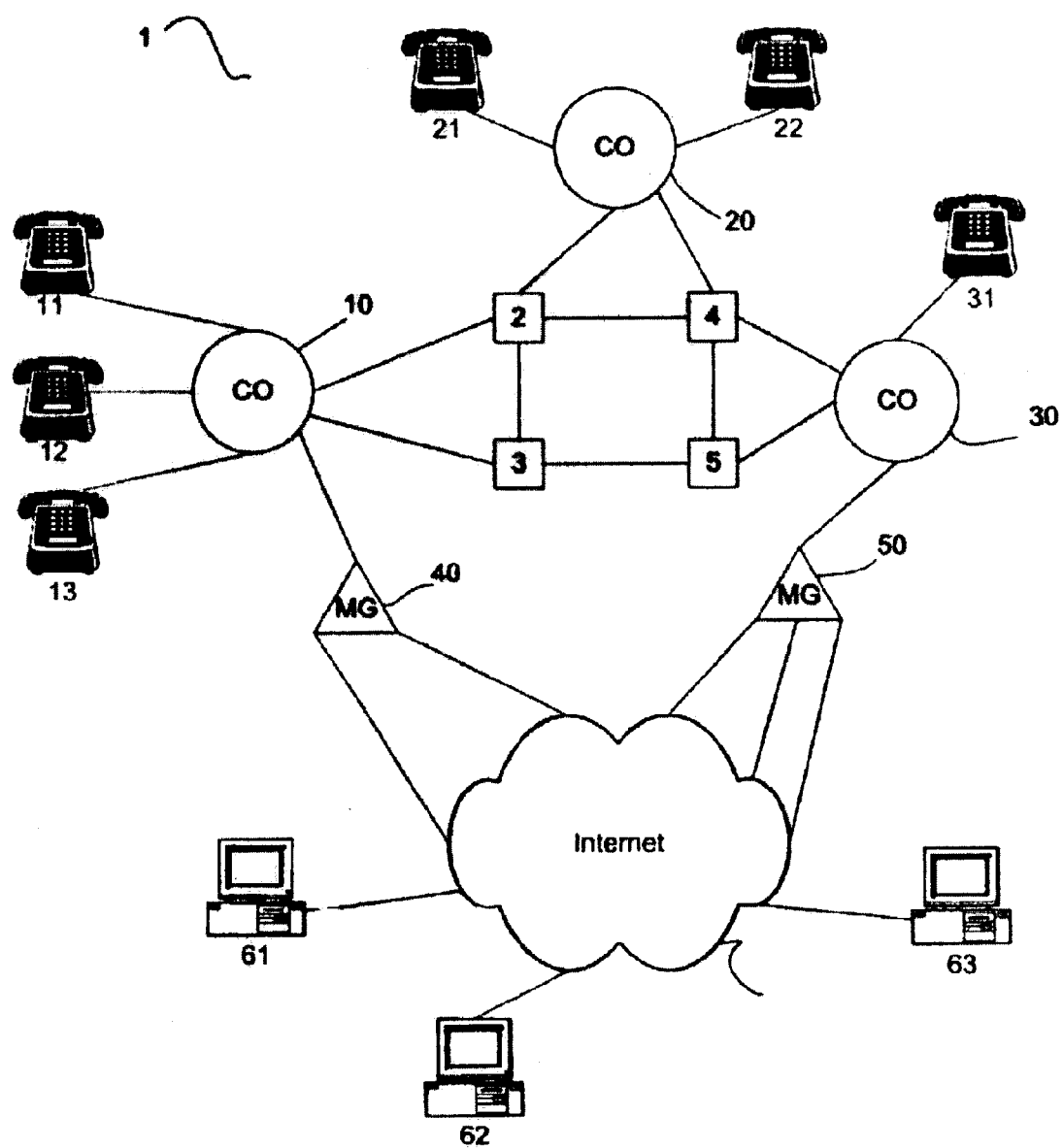
FIG. 1 is a diagram showing an exemplary telephone to internet connection according to embodiments of the present invention.

The present invention may be further understood with reference to the following description of preferred exemplary embodiments and the related appended drawings, wherein like elements are provided with the same reference numerals. The exemplary embodiments described herein refer to voice communications (e.g., phone calls). However, those of skill in the art will understand that the present invention may be equally applied to systems, networks and/or hardware used for communication of data or other information. Those of skill in the art will also understand the basic concepts of the transmission of voice and/or data information across network devices. Those who desire a more detailed discussion of network data transfer may consult a reference such as, Perlman, Radia "Interconnections Second Edition—Bridges, Routers, Switches, and Internetworking Protocols," Addison Wesley, 2000.

FIG. 1 shows an exemplary network arrangement 1 for the connection of voice communications. The network arrangement 1 includes three central offices ("CO") 10-30 which are locations where telephone companies terminate customer lines and locate switching equipment to interconnect those lines with other networks. In this example, the customer lines 11-13 terminate at the CO 10, the customer lines 21-22 terminate at the CO 20 and the customer line 31 terminates at the CO 30. The customer lines may be any type of lines, for example, plain old telephone service ("POTS") lines, integrated services digital network ("ISDN") lines, frame relay ("FR") lines, etc. In this example, each of the customer lines (e.g., customer line 11) may be considered a POTS line attached to a standard telephone at the customer location.

Between the COs 10-30, there may be a series of switching stations 2-5. These switching stations 2-5 direct the calls along a route from a transmitting CO to a receiving CO. For example, a user on the customer line 11 may attempt to call a user at the customer line 31. The call may be transmitted from the customer line 11 to the CO 10, which will then route the call into the system to arrive at the CO 30. When the call is in the system, it may take a variety of routes between the CO 10 and the CO 30 based on various parameters, e.g., system traffic, shortest route, unavailable switches, etc. In this example, the call may be routed from the CO 10 to the switching station 2, through to the switching station 4 and then to the CO 30 which connects the call to the customer line 31. The portion of the network arrangement 1 described above may be considered the PSTN portion of exemplary network arrangement 1.

In addition, there may be a VoIP portion of network arrangement 1. In this example, personal computers ("PC") 61 and 62 may be equipped with hardware and software allowing users to make voice phone calls. The PCs 61-62 have connections to the Internet 60 for the transmission of the voice data for the phone calls made by the users. If a PC user makes a voice call to another PC user (e.g., user of PC 61 calls user of PC 62), the call may be routed from the PC 61 through the Internet 60 to the PC 62. However, for calls from the PSTN portion of the network arrangement 1 to the VoIP portion and vice-versa, media gateway units ("MG") 40-50 may be used as routers for such calls. Thus, if the user of PC 61 calls the user of customer line 31, the call may be routed from the PC 61 through the Internet 60 to the MG 50, and further to the CO 30 which connects the call to the customer line 31. Those of skill in the art will understand that the previously described components are only exemplary and that there may be other components used to route calls, for example, the VoIP portion of the network may contain a media gateway controller.

As seen from the examples described above, the phone calls may be routed through the exemplary network arrangement 1 by a variety of hardware devices (e.g., COs, switching stations, MGs, etc.). Standards groups have been set up to promulgate standardized protocols used to route these phone calls through different telephone systems. For example, Signaling System 7 ("SS7") is a telecommunications protocol defined by the International Telecommunications Union ("ITU"). For a more detailed discussion of SS7 see the following standard publication, "ANSI, T1.110-1992, Signaling System 7 (SS7) General Information, 1992". Also see the sequence of standards, ANSI, T1.111-114, related to SS7. In general, the SS7 protocol is implemented on equipment used in the PSTN portion of the network 1 (e.g., CO 10-30, switching stations 2-5), and may be used for a variety of features related to phone calls, for example, basic call setup, management, tear down, local number portability, toll-free and toll wireline services, call forwarding, three-way calling, etc.

A protocol standard of particular relevance to the present invention used in the VoIP portion of network arrangement 1 is the MEGACO standard, developed by the Internet Engineering Task Force ("IETF"). For a more detailed discussion of the MEGACO standard see the following publication, "IETF, RFC 3015, Megaco Protocol Version 1.0." MEGACO defines the protocols used between elements of a physically decomposed multimedia gateway consisting of a MG unit (e.g., MG's 40, 50) and a Media Gateway Controller (MGC) 63, formed by a special purpose computer configured to control MG's 40, 50. The MGC 63 sends instructions to the MG unit, such as instructions on which lines are to be used. Those of skill in the art will understand that the above described protocols are only exemplary and that additional implemented protocols exist, while new protocols may be implemented in the future. The present invention is equally applicable to any of these systems implementing protocols.

Each of the described components in network arrangement 1 may implement a variety of protocols to route calls to the desired location. The components may include one or more electronic memory devices and processors, or other computing devices, to provide the desired functionality (e.g., routing of the phone calls, etc.). Thus, these components may contain software elements to instruct the processor or other computing device to perform the desired functions and to implement the various protocols. The present invention may thus be implemented on the above described components, or on any other processor based components used to further the transfer of information through a network.

An exemplary embodiment of the software architecture according to the present invention, is implemented in a media gateway (MG) software component, which is functionally located between an user's host application and a native transport layer of a network connection. For example, the user's host application may be an hardware service provider (HSP), and the native transport layer may include UDP, TCP, etc. The Megaco software component's architecture includes several elements, such as a core module, an HSP API interface, an encode-decode library and other data transfer elements. Operating management and system services may be provided by a system management entity (SME) and a system library (SYSLIB), as well as by delivery agents (DA's). The Megaco software component, together with the HSP forms the media gateway unit 40, 50 shown in FIG. 1, used to connect the PSTN and the VoIP portions of the network 1.

Figure 2:
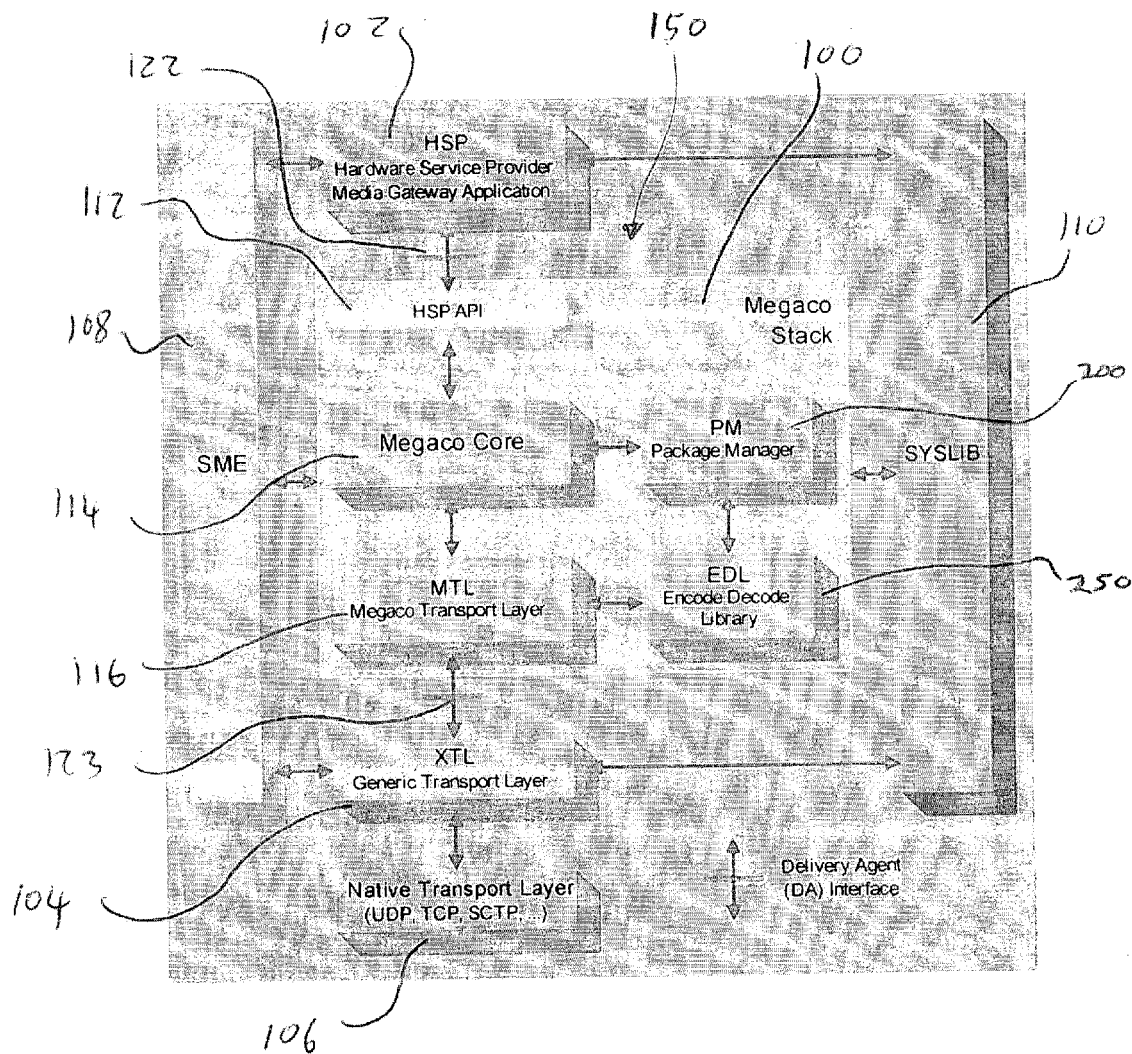
FIG. 2 is a schematic diagram showing a media gateway unit according to embodiments of the present invention.

FIG. 2 shows one exemplary implementation of the Megaco software component 150 according to the present invention. HSP 102 is a media gateway application that has the primary function to provide hardware services. It may include codecs, compression devices, tone generation and detection functions and line terminations. As indicated above, HSP 102 may include both hardware elements and software elements adapted to carry out its functions. HSP 102 is a component provided by the system manufacturer and will vary widely from one system to another. This is in contrast to the Megaco software, which will typically not change from one system to another. XTL 104 is a generic transport layer that serves as an abstraction to the underlying native transport layer 106. XTL 104 provides a protocol-independent transport interface that supports in a uniform manner multiple underlying transport networks, such as IP, ATM, UDP, TCP and other future or already existent transport protocols. XTL 104 includes an interface that handles protocols in an uniform and generic manner, to remove the requirement of any knowledge specific to the underlying transport layer from the Megaco stack 100.

Megaco stack 100 may include a core module 114 connected to HSP 102 via an interface such as API 112. Core module 114 maintains a list of the terminations supported by the media gateway and a list of contexts created by the media gateway controller, and also executes the commands issued by the MGC 63. Multiple commands may be contained within a single transaction processed by core module 114. A list of commands is received in a single transaction from transport layer MTL 116, which will be described below. Core module 114 may then execute the commands one by one, for example in the sequence given in the list. The responses to the commands may be written to a buffer, for later use. Depending on the command being executed, the core module 114 may create new contexts, modify existing contexts, and add or remove terminations from a context. In addition, core module 114 may send messages to the HSP 102 through HSP API 112, which instruct the system-specific applications associated with HSP 102 to perform various functions. The instructions sent by core module 114 may include instructions to connect two or more media flows to terminations, to apply a signal to a termination, or to receive an event that has occurred on a termination. The instructions may also include commands to retrieve statistics on a termination, and to process notifications on whether an occurred event has been requested by the MGC 63.

Another element that may be included in the Megaco stack 100 is the transport layer MTL 116, which provides for the reliable transport of messages of the stack 100. MTL 116 provides the transaction and retransmission features specified by the Megaco protocol. Further details of the operation of MTL 116 will be well known by those of skill in the art.

An encode/decode library EDL 250, shown in FIG. 2, may also be a part of Megaco stack 100. EDL 250 is a library of functions which are used to encode and decode the Megaco protocol messages exchanged between an MG and an MGC. Using EDL 250, text based messages may be converted to data structures and vice-versa. For example, messages received from the network may be text based messages. However, it may be simpler to work with data structures rather than with text messages within the code of Megaco stack 100. In that case, EDL 250 may be employed to convert the text based messages to data structures. Similarly, when data structures are sent to the network, the library EDL 250 may be used to convert the data structures of Megaco stack 100 into text based messages before sending them. Further details of the operation of EDL 250 will be described below.

In a typical application, the Megaco protocol used in the Megaco stack 100 uses packages as the designated means of extension, to support different services and media types and to transmit information. For example, a package may consist of properties, events, statistics and signals such as ringing, announcements and tone generation. A termination utilizes a set of such packages, and represents a stream entering or leaving the media gateway unit. Terminations may have properties such as the maximum size of a buffer, which may be inspected and modified by the media gateway controller. Terminations may be placed into contexts, which are defined by two or more termination streams that are mixed together. A simple call may include two terminations per context, while a conference call may include dozens of terminations, each representing one leg of the conference call. A termination may have multiple streams, in which case the context may be a multi-stream context. Packages and terminations thus form a framework within which messages are sent and received, according to exemplary embodiments of the invention.

Megaco defines a base set of packages for certain common capabilities, such as analog and digital loops, DTMF detection and generation, and RTP. However, various governing bodies continuously define new packages to enable additional capabilities. By defining a package, all the specific characteristics of a termination that realizes how that package is defined, and all gateways that implement that package can be controlled by a media gateway controller that understands the package. In the embodiments according to the present invention, a package manager (PM) 200 is used to resolve the package-related operations that take place in the media gateway unit. The package manager thus simplifies the processing of functions that are used in the transmission of messages within the system, according to embodiments of the invention. PM 200 allows system-specific additions that may be needed by the HSP 102, without the need to modify common components of Megaco stack 100. In particular, PM 200 may include helper functions that encode and decode messages. Action by PM 200 may be invoked by the various function calls invoked by EDL 250.

In one exemplary embodiment, package manager 200 may be designed to process text based messages. However, package manager 200 may also be designed to be easily extensible to handle different types of messages, such as binary encoded messages. To facilitate expansion of the package manager's capabilities, a clear separation may be designed between various functions of package manager 200. A package resolver portion may be provided, which uses routines to parse the text or look at encoding in ASN.1 (binary), to find the package for which it is responsible. A package helper portion 204 may be provided, containing package-specific routines to resolve the event, signal properties or statistics of the package, and to return as the output an event, signal, statistic or property descriptor structure. The package manager 200 maintains the information about the packages supported by Megaco stack 100 in a library, such as encode/decode library (EDL) 250. This library provides the base API used to encode and decode package-related structures and also provides for the reverse resolution of hardware-related events and signals into package-defined events and signals.

Figure 3:
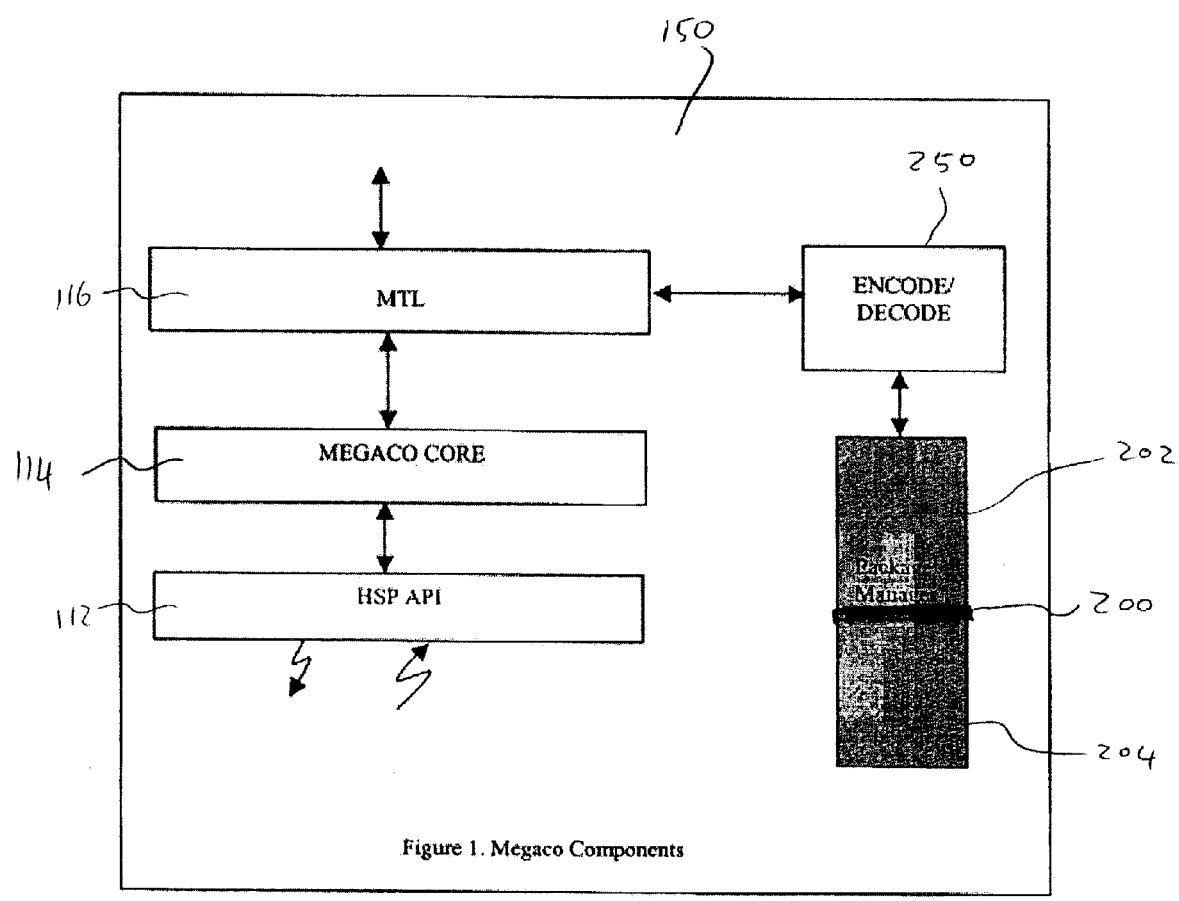
FIG. 3 is a schematic diagram showing an embodiment of a media gateway software component according to the present invention.

In the exemplary embodiments, the package manager 200 may interface with an encode/decode engine of the EDL 250, as shown in FIG. 3. Under this exemplary arrangement, the PM 200 is considered to be a service for package related operations, and the EDL 250 of the Megaco stack 150' is considered to be the client for those services. To properly perform its function, PM 200 according to exemplary embodiments of the invention is configured to be extensible, so that new packages may be processed as they become available. A minimal amount of changes in the code of any module related to the PM is necessary to accommodate new packages. Such changes are restricted to changes to the EDL 250 and to the event handling functions used in the Megaco core 114. According to exemplary embodiments of PM 200, its operation is completely opaque to other modules of the media gateway software element. In other words, PM 200 is seen by the other components as a set of services that are available to them through the defined interfaces. Initially, the exemplary system has approximately 30 packages that have to be realized by the media gateway, however PM 200 is scalable to handle more packages.

As indicated above, PM 200 performs two functions, and in the exemplary embodiment is divided into two distinct parts. The first part of PM 200 is the package resolver (PR) 202, shown schematically in FIG. 3, and the second part is the package helper 204. Package resolver 202 provides all the interfaces that expose the PM 200 to the outside environment, such as HSP API 112 and EDL 250. PR 202 thus forms the portion of PM 200 that communicates with the remainder of the Megaco software component 150. In particular, interfaces used to encode and to decode messages are provided to connect package resolver 202 of PM 200 with the encode-decode library (EDL) 250. In the encode step, the PM 200 performs the function of creating structures from the contents of a message buffer. One such exemplary structures is the MEG_PKG_ENTRY structure, containing lists of events. In the decode step, the reverse functions are performed, in which a message buffer is created corresponding to a given structure. The second part of PM 200 includes a package helper (PH) 204 which contains the routines that are specific for every package. These functions are invoked only internally by the package resolver 202, during the encoding and decoding operations. Each package provides ten functions to the system, to address the text and the binary modes of the five types of identifiers that are currently used in packages.

The decode interface to EDL 250 of package resolver 202 may be adapted to resolve five types of descriptors. These may include, for example, descriptors for Events, Signals, Statistics, Observed Events, and Properties. The process used to resolve the descriptors may include the following exemplary steps. These steps typically will be optimized either for a text-based message, or for binary encoded messages. The first step involves looking at the "name" field in the descriptor for a text based encoded message to find the appropriate package. In the case of a binary encoded message, the interface looks at the first 16 bits of the "id" field, and from that is able to find the appropriate package. For every package that may be received by the package manager 200, there are five kinds of functions that are known to or registered with the package resolver 202. For example, each of the five possible descriptors listed above which may be used in the package has a corresponding decode function associated with it. Different decode functions may be used to process the text version and the binary version of the packages, resulting in a total of ten distinct functions which may be used to transfer the messages being processed between EDL 250 and PM 200.

Once the specific decode function is invoked, based on the descriptor and on the text or binary nature of the message, the correct "helper" function is invoked by PM 200, to actually resolve the package. The message to be decoded is sent to PR 202 via the decode function called by EDL 250. PR 202 then invokes the helper function as will be described below. The helper functions may be stored, for example, in the package helper 204. These functions are invoked with the message buffer contents received from EDL 250 as their arguments. The output status returned by the helper functions may be included as an error descriptor in the output structure itself, and may be passed as such to the EDL 250 to indicate the outcome of the decode operation.

The encode interface between the PM 200 and EDL 250 is similar to the decode interface described above. In this case, the reverse function is performed, and a message buffer is created from the received structure. In this case, the helper functions for the specific descriptor of the structure stored in package helper 202 are invoked, with instructions to perform the encoding operation instead of the decoding operation. These functions may be the same functions as used to decode the messages, but may be invoked with control parameters indicating encoding rather than decoding operations. Alternatively, these may be separate functions dedicated to the requested operation.

Package resolver 202 may be configured to maintain a list of all packages that are registered with it, for example, in the form of a linked list. Each entry corresponding to a package may include, for example, a pointer to two helper routines for each of Events, Signals, Properties, Statistics and Observed Events. One of the routines may be responsible for encoding these descriptors, while the other for decoding them. Routines may be provided for descriptors of text messages, for example in ABNF format, and for binary messages, for example in ASN.1 BER format. An exemplary format of the linked list is shown in Table I. The primary key used to search through the linked list is given by the "name" field in the case of text encoding, and the "pkg_id" field in the case of binary encoding. In this manner, when new packages are added, all that has to be done is to add code to the routine storage area, for example EDL 250, and then a pointer is simply added to point to the new code in the storage area.

The package manager 200 may include functions used to perform management tasks, as well as those functions that perform the encoding and decoding operations. For example, functions to initialize the package manager 200 may be included, that are responsible for filling up the resolver package list. The initialization functions may be invoked by the Megaco core 114 or by any user through the media gateway controller, to create and to fill in the package list. The initialization function may have a mode that is used to add new packages once the package list has already been created, or, alternatively, a separate function may be provided to add new packages.

As indicated above, the package manager 202 may be designed to interface only with EDL 250 while performing the encode and decode operations. Thus, at the EDL 250 interface, two functions are carried out. First, the PM 200 decodes into structures the received messages. Second, PM 200 encodes the structures into messages that include text strings or binary strings. The individual functions will be described below. All functions are prefixed with the "Meg" string, to indicate that the functions are public with respect to the media gateway controller. The buffer structure used within the Megaco system may be used as a parameter that is passed by the functions. This allows the original source message, as well as the encoded or decoded output to be passed between EDL 250 and PM 200.

The following functional calls may be used at the interface between EDL 250 and PM 200 to invoke the specific helper functions that perform various encoding and decoding operations, as well as to carry out management tasks. These functions may pass arguments to the helper functions together with control parameters to instruct the helper functions on what to do. Initialization of the package manager 200 may be carried out by invoking an initialization function such as "MegPmlnint( )". This function may be called by the Megaco core 114 within the media gateway itself, or may be called by any user of the EDL 250 through the media gateway controller. This function may be used to rebuild an existing package list, or to create a new package list. In one embodiment, the initialization function uses an indirect method to build the package list, so that the structure may be retained when a dynamic registration process is used. In this example, the "MegPmlnint( )" function calls the initialization functions provided for every package being listed. Each of these package-specific functions, in turn, may build the structure holding the package information, and may call another function that adds such package to the list of packages. The arguments of the initialization function may include, for example, calls to the individual initialization functions of all the packages being used.

A function such as "MegPkgAdd( )" may be used to add packages to the package list. This function is called by every package to register itself with the package list of the package resolver 202, so that the entry points for resolution of the package are registered. The structure holding package information is filled in as the various "add package" functions are executed, and is passed as the parameter for those functions. The actions taken by a function such as "MegPkgAdd( )" may include allocating spaces in the package information structure, and initializing in that structure the package name and package id, respectively, for textual and binary packages. The "MegPkgAdd( )" function may also set the pointers for the functions on the package helper 204, which may be set to null if a particular corresponding descriptor is not in the package. In case that the package being added extends any other package, the name or id of the package being extended is specified, and the list of packages is searched for that package. If the extended package is found, a pointer to that package is placed in a specific field of the list of packages of the package helper. If the package being extended is not found, an error is reported, and the extending package is not added.

Other functions are provided to encode and to decode messages through the interface to EDL 250. In exemplary embodiments according to the present invention, these functional calls may include the following functions. A function for decoding text events may be called to decode an event descriptor in a Megaco text message that is being decoded. Event descriptors contain package specific information and can be partially decoded by EDL 250, which also allocates the list of events contained in the event descriptors and sets the package name field. The entire event descriptor is passed as a parameter, and a list of events is returned as a linked list. In case of errors, or if no event descriptors are found, the list may be null. In that case, no events are to be notified to the media gateway controller. The operation of the function may include getting the package name, searching the package list for the name to get the MEG_PKG_ENTRY structure for the package, and invoking the text events helper function from the structure, with the cursor set after the package name. The event returned may then be appended to the end of the list, and the process is repeated until there is nothing left in the linked list.

A function for decoding binary events may be provided. This function is called to decode an event descriptor in a Megaco message that has been encoded in ASN.1 binary format. These event descriptors cannot be decoded by EDL 250. When calling this function, the cursor is initially pointed to the starting octet of the package id. A linked list of events is returned as the function's output, which may be a null list if no events descriptor is found, or if an error occurred. An exemplary sequence of operations carried out by this function may include getting the package id, searching for the package in the package list and getting the MEG_PKG_ENTRY structure for the package, and invoking the appropriate binary events helper function from this structure with the cursor set to the octet after the package id. The event returned by the function is appended to the end of the list, and the process is repeated until reaching the end of the specified length field.

A function for encoding text events may be invoked to encode an events descriptor from a MEG_EVENT structure to be sent as a Megaco text message. The MEG_EVENT structure is allocated and filled out by the caller, and is not freed by the package manager 200. The buffer used to fill the encoded contents may also be allocated by the caller, and the current cursor position is passed to the PM 200 as a parameter, which may be a buffer in which EDL 250 has encoded part of the message. If the encoding is successful, PM 200 may update the cursor position to the first byte after the end of the encoded contents. The procedure followed by this function may include searching for the package in the package list, using the package name, and obtaining the MEG_PKG_ENTRY structure for the package. The proper text events helper function is then invoked from the structure, with a request to encode, and an error descriptor is generated if no package was found.

An encoding binary events function may be invoked to encode an events descriptor from the MEG_EVENTS structure and to send an ASN.1 binary Megaco message. The MEG_EVENTS structure is again allocated and filled by the caller, and is not freed by PM 200. As above, the buffer used to fill the encoded contents may also be allocated by the caller, and the current cursor position is passed to the PM 200 as a parameter, which may be a buffer in which EDL 250 has encoded part of the message. If the encoding is successful, PM 200 may update the cursor position to the first byte after the end of the encoded contents. The steps taken by the function may include searching for the package in the package list, and getting the MEG_PKG_ENTRY structure for such package. If the package is not found, an error is generated, otherwise the helper function is invoked from the structure with an encode request.

To decode a signal descriptor in Megaco text messages, a decoding text signals function may be used. A list of signals is returned as a linked list, which may be null in case of errors or if no signal descriptor was found. A null return may also result from an empty signal list being supplied, indicating that the signals currently being applied are to be stopped. Steps carried out by the function may include getting the package name, searching for the name in the package list and obtaining the proper MEG_PKG_ENTRY structure, invoking the text signals helper function from the structure with the cursor set after the package name, and appending the MEG_SIGNAL returned to the end of the list. This is repeated until nothing is left in the linked list To decode a signal descriptor into an ASN.1 binary Megaco message, a decoding binary signals function may be provided. The entire descriptor is passed as a parameter, and the cursor is positioned to the start of the signals descriptor, specifically at the starting octet of the signal descriptor. PM 200 then decodes until the end of the descriptor is reached, and returns the results in a linked list or signals array. A null return may also result from an error or an empty signal list being supplied, indicating that the signals currently being applied are to be stopped. Exemplary steps include obtaining the package name, searching the package list for the package name, and obtaining the MEG_PKG_ENTRY structure for that package. The binary signal helper function is then invoked with the cursor set to the octet after the package id, and the MEG_SIGNAL returned is appended to the and of the list. The steps are repeated until there is nothing left in the linked list.

An encode text signals function is provided to encode signals descriptors from the MEG_SIGNALS structure and sending it as a Megaco text message. This function searches for the package in the package list and obtains the MEG_PKG_ENTRY structure for that package. The function then invokes the proper text signal helper function from the MEG_PKG_ENTRY structure, with a request to perform the encode process. As in other "encode" functions, the caller allocates and fills the MEG_SIGNALS structure. The buffer to fill the encoded contents is also allocated by the caller, and will contain parts of the message already encoded by the EDL 250.

The encoding of signal descriptors in MEG_SIGNAL structure to be sent as a Megaco ASN.1 binary message is carried out by an encode binary signals function. This "encode" function uses a MEG_SIGNAL structure that is allocated and filled by the caller. As described above, a buffer for the encoded contents is allocated by the caller, and contains the portions of the message already encoded by EDL 250. This encode function searches for the appropriate package in the package list, and obtains the MEG_PKG_ENTRY structure for that package. The appropriate binary signal helper function is invoked from the structure, with an encode instruction.

According to exemplary embodiments of the present invention, similar encode and decode functions may also be provided for textual and binary formats of package components. These additional components may include "statistics", "properties" and "observed events". For each of these package elements four functions are provided at the interface between the EDL 250 and the package resolver 202, to encode and decode text formats, and to encode and decode binary formats. Each of the package components is also associated with two helper functions stored in the package helper 204, called by the encode and the decode functions of the interface. The helper functions are designed to handle the text and binary formats of the package component. Each of these helper functions can decode or encode the package component, depending on the control parameters sent by the package resolver 202.

In the exemplary embodiment described above, different functions are used in the interface between the EDL 250 and the PM 200 to encode and to decode events, signals, properties and other package elements. In a different embodiment, the same functionality may be achieved by having a single encode/decode routine, with a parameter being passed as a descriptor for the operation to be performed. However, in many cases some encode/decode functions for an element may be shared between different packages, while others may not. Using separate functions enhances the ability to reuse the encode/decode functions.

An exemplary interaction between the EDL 250 and PM 200 to decode a text message is described below. The message is received by the EDL 250, for example from Megaco stack 100, and is forwarded to package resolver 202 of PM 200 for processing. The message may contain, for example, two event descriptors and one signal descriptor. Table II shows the original message, and table III shows the decoded message.

The decoding begins when EDL 250 recognizes that the message contains both events and signals. More specifically, EDL 250 determines that two event descriptors and one signal descriptor are present. The text of the message string is passed to the package manager 200 in a buffer, using the appropriate decode function. In this case, a decode text event function sends the message to the package resolver 202 of package manager 200. Package resolver 202 begins decoding the text string containing the Megaco event descriptor. It parses the text string and finds out that it contains two parts, corresponding to two event descriptors, and finds the names of the two event descriptors, for example "al" and "dd".

The decoding continues with the package resolver 202 searching through the package list to find the named package structure, for instance the structure for package "al". For the current event, in this case the event "al", the package resolver 202 calls the text event helper function appropriate to that event. The text helper function is described by the function pointer included in the package structure. The buffer containing the parameters passed to the helper function at this time only contains the information relevant to this operation, namely the information associated with the event "al". The package specific helper function processes the string sent by the package resolver 202, and recognized that it represents an event, for example defined by the MEG_H-WEVT_ONHOOK variable. The helper function also determines whether the package is in a form that is acceptable to the package manager 200.

After these preliminary steps are carried out, the helper function performs the actual decoding of the message. A MEG_EVENTS structure is formed, which contains the name of the event and the various parameters related to the event that are contained in the original signal. The structure is returned to the package resolver 202 as the output of the helper function found in package helper 204. The package resolver 202 determines that the decoding operation has been carried out successfully, based on parameters returned as the helper function's output. If there are more events contained in the message, the package resolver 202 repeats the decoding operation to decode the additional event. If no additional events are present, EDL 250 passes the next type of signal to package resolver 202 of package manager 200.

In this example, a second event named "dd" is present. The package resolver 202 searches for the new package name in the package list, and calls the appropriate helper function using the pointer specified in the package structure. As before, the buffer is filled by the package resolver 202 with information relevant to the decoding of the second event "dd". For the event "dd", the text event helper function looks at the entire text and recognizes it as an event defined by the MEG_HWEVT_DDCOMPLETION variable. The helper function also recognizes any parameters that may be included with the argument being passed, such as "digitmap", "EmbedSignals", "EmbedEvents" and "keepActiveFlg" parameters.

Next, the helper function forms a MEG_EVENTS structure containing the name of the event, MEG_HWEVT_DDCOMPLETION in this case, and the various parameters and variables associated with the event. The resolver 202 determines whether the decoding was successful, based on the return code received from the helper function of the package helper 204, and fills out the appropriate error code accordingly, to indicate a successful decoding.

When EDL 250 finds the operation to be successful, the process determines if additional package elements have to be decoded. In this exemplary case, there is a signal message that is to be decoded. EDL 250 is directed to resume the process, where it calls the PM 200 using a decode text signals function, with the appropriate arguments. The steps undertaken for signals are similar to those for an event message. The decode function is invoked, and package resolver 202 receives the message and parses it to determine the name of the signal. In this example, the signal is named "cg", and package resolver 202 searches through the package list to find the "cg" package structure. PR 202 then calls the appropriate text signal helper function from package helper 204, using the function pointer of the structure.

The text signal helper function looks at the string and determines if it refers to a signal, and also determines what, if any, parameters are included. The decoding of the signal message is carried out by the helper routine, which forms a MEG_SIGNALS structure containing the name of the signal ("cg" in the example), and various associated parameters. The structure also includes an indication that the decoding was successful, and is returned to package resolver 202 as an output of the helper function. Package resolver 202 finds the operation to be successful, and returns the results to EDL 250 as a successful decoding. Since there are no more messages of this type, i.e., no more signals, the process proceeds to determine that there are no additional messages of other types to be decoded. If there are no additional messages, then the decoding process ends.

Although the present invention was described with reference to specific exemplary embodiments, the same system can be applied with minimal changes to different arrangements. For example, additional package elements may be defined other than the five described above. Corresponding additional functions used to invoke the package resolver, and additional package helper functions may be defined in other exemplary embodiments. The specification and drawings are thus to be regarded as being illustrative rather than restrictive. It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A system comprising:
   a package manager configured to receive from an encode/decode library a message to be encoded or decoded;
   a package resolver element of the package manager configured to receive the message and structures from the encode/decode library, and to invoke helper functions; and
   a package helper element of the package manager, configured to provide the helper functions to the package resolver element, the helper functions performing at least one of encoding operations and decoding operations on the message.

2. The system according to claim 1, further comprising an interface of the package resolver configured to receive one of an encode and a decode function from the encode/decode library, the function having an argument formed at least in part from the message.

3. The system according to claim 2, wherein the package resolver is configured to retrieve a package name from the encode and decode function, and to obtain a function pointer corresponding to the retrieved package name, the function pointer indicating one of the helper functions.

4. The system according to claim 2, wherein the package resolver is configured to obtain a function pointer from the encode and decode function, and to invoke one of the helper functions of the package helper indicated by the function pointer.

5. The system according to claim 1, further comprising a package list of the package resolver, the package list containing package names of packages registered with the package manager.

6. The system according to claim 1, further comprising a computer memory of the package helper containing the helper functions performing encoding and decoding of the message.

7. The system according to claim 1, wherein the helper functions include helper functions optimized for binary and for textual messages.

8. The system according to claim 1, wherein the helper functions are categorized in sets, each set being associated with a specific package.

9. The system according to claim 8, wherein the helper functions comprise helper functions optimized for different package elements.

10. The system according to claim 8, wherein the helper functions comprise functions optimized for messages containing a descriptor for one of an event, a signal, a statistic, a property and an observed event.

11. The system according to claim 2, wherein the encode and decode functions comprise functions optimized for messages containing a descriptor for one of an event, a signal, a statistic, a property and an observed event.

12. The system according to claim 1, wherein the message is one of a structure and a text/binary string.

13. The system according to claim 12, wherein the package resolver uses the helper function to decode the text/binary string into an output structure, and to encode the structure into an output text/binary string.

14. A method for encoding and decoding a package descriptor of a package in a media gateway component, comprising:
   receiving in a package manager one of an encode and decode function from an encode/decode library, the function having an argument formed at least in part from the package descriptor;
   obtaining a pointer for an helper function associated with the argument, the helper function being adapted to perform one of an encoding and a decoding operation; and
   invoking the helper function to perform one of the encode and the decode operation on the argument.

15. The method according to claim 14, further comprising parsing the argument in the package manager to determine a package name associated with the package descriptor.

16. The method according to claim 15, further comprising determining if the package descriptor is associated with an additional package name.

17. The method according to claim 15, further comprising searching a package list of the package manager to obtain the pointer for the helper function associated with the package descriptor.

18. The method according to claim 14, further comprising interfacing with the encode/decode library via a package resolver portion of the package manager, the package resolver portion being configured to invoke the helper function.

19. The method according to claim 14, further comprising storing the helper function in a package helper portion of the package manager.

20. The method according to claim 14, further comprising invoking the helper function with a parameter requesting one of encoding and decoding operations on the argument.

21. The method according to claim 20, further comprising generating, in a decoding operation, a structure derived from the argument.

22. The method according to claim 20, further comprising generating, in an encoding operation, a text/binary string message derived from the argument.

23. The method according to claim 14, further comprising registering the package with the package manager, and providing the package resolver with a package list correlating package descriptor names with helper function pointers.

24. The method according to claim 14, further comprising storing the package descriptor in a memory buffer, and relating the argument to the memory buffer.

25. A media gateway component, comprising:
   an encode/decode library to process text/binary strings and structures containing package descriptors;
   a package manager to decode the text/binary strings into output structures, and to encode the structures into output text/binary strings;

a package resolver portion of the package manager adapted to receive the text/binary strings and the structures from the encode/decode library, and to invoke helper functions to carry out encoding and decoding operations; and a package helper portion of the package manager, adapted to store the helper functions.

26. The media gateway according to claim 25, wherein the package resolver portion is adapted to parse the text/binary strings and the structures to resolve a name of the package descriptors.

27. The media gateway according to claim 25, wherein the package resolver portion is adapted to derive a pointer to invoke the helper function appropriate to a corresponding one of the package descriptors.

28. A system for routing a message between a telephone network and a data network, comprising:

a media gateway connecting the telephone network and the data network;

a media gateway controller adapted to issue instructions to the media gateway;

a package manager of the media gateway configured to receive from an encode/decode library a message to be encoded or decoded according to the instructions;

a package resolver element of the package manager configured to receive the message and structures from the encode/decode library, and to invoke helper functions;

a package helper element of the package manager, configured to provide the helper functions to the package resolver element, the helper functions performing at least one of encoding operations and decoding operations on the message;

an interface of the package resolver configured to receive one of an encode and a decode function from the encode/decode library, the function having an argument formed at least in part from the message; and a function pointer obtained from the function, the function pointer indicating a specific one of the helper functions to be provided to the package resolver.

* * * * *